Patented Apr. 25, 1933

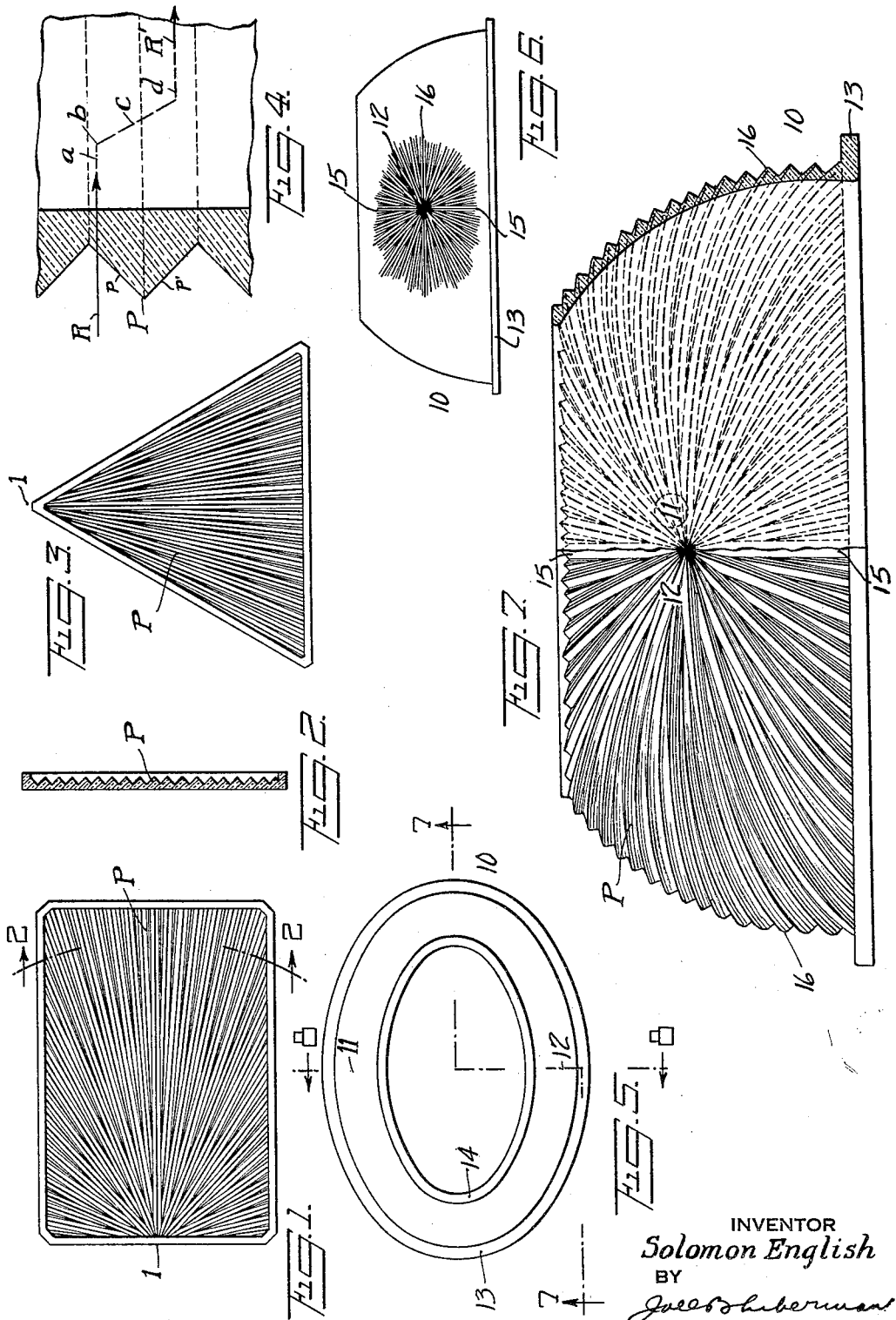

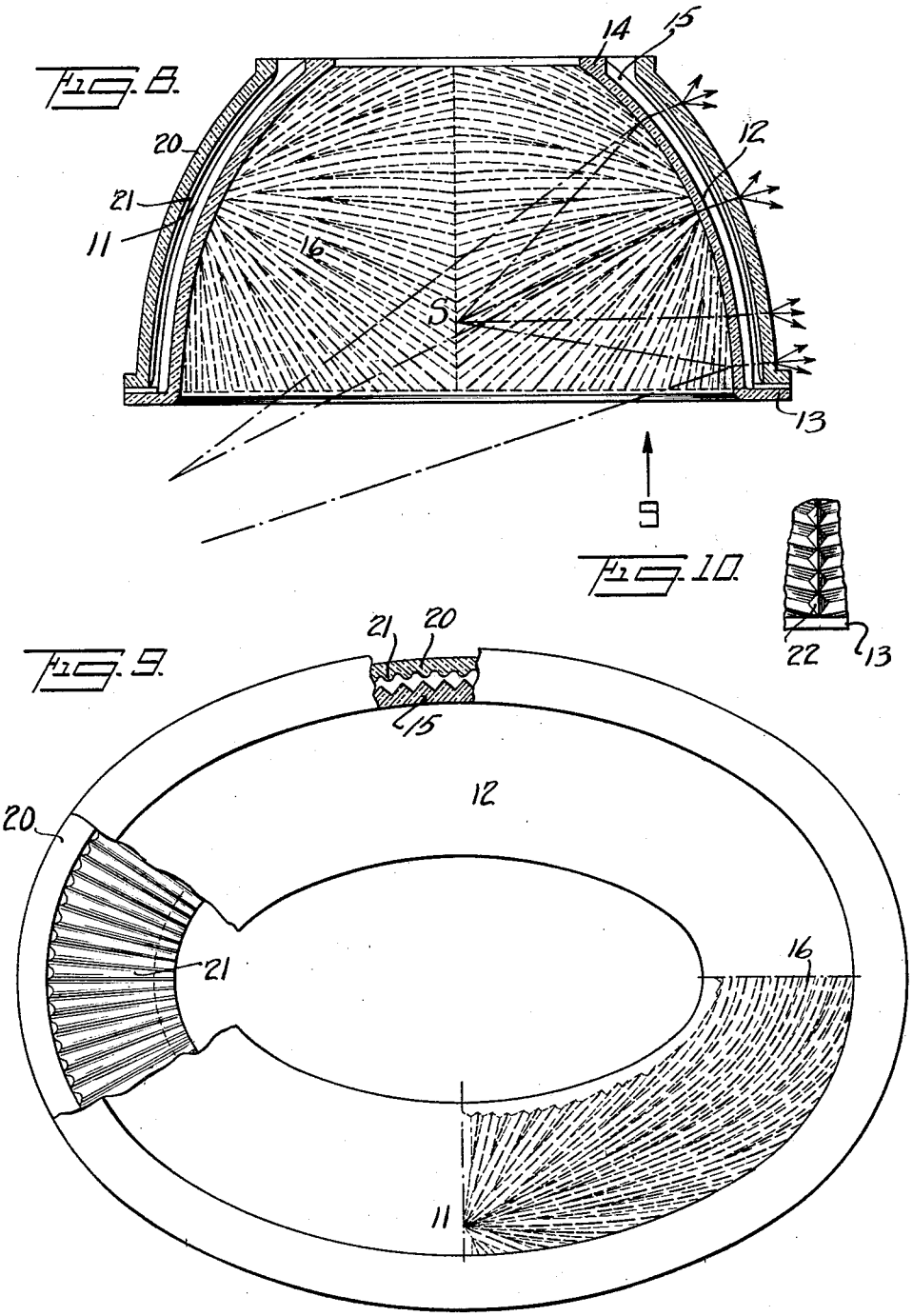

1,905,829

UNITED STATES PATENT OFFICE

SOLOMON ENGLISH, OF LONDON, ENGLAND, ASSIGNOR TO HOLOPHANE COMPANY, INC., OF NEW YORK, N. Y., A CORPORATION OF NEW YORK

LUMINAIR EMPLOYING PRISMATIC REFLECTORS

Application filed February 10, 1932, Serial No. 591,945, and in Great Britain February 18, 1931.

The present invention relates to improvements in luminairs employing prismatic reflectors.

The ordinary prismatic reflector consists essentially of a "body" of glass of circular section carrying right angled prisms on the exterior surface. The determining factor in the design of such a reflector appears to have been the necessity of arranging the prisms in such a way that the light rays were incident at right angles to the glass surface (when viewed in section).

Such considerations have led to the employment of right angled reflecting prisms almost entirely on bodies of circular section, and the placing of the lamps on the axis passing through the centre of the circle. In a few cases these prisms are used on bodies of other section, e.g. a square section reflector as for instance described in Mygatt Patent No. 1,097,042. In the reflector described in this patent specification the prisms in the middle of each side (regarded as 90—45—45° prisms) are set on the body glass in the ordinary way, but the others are placed with their hypotenuse face set at an angle to the flat face of the body glass. This angle increases as the distance from the centre prism increases.

A slight modification of this type of prism is the subject matter of Dorey Patent No. 1,612,804, in which the reflecting prisms are set at varying angles to the face of a cylindrical body glass.

This providing of prisms at varying angles is a difficult operation and the glassware, when finished, always has intermediate zones between the 90—45—45° prisms through which the light rays pass unreflected.

In the design of reflectors of non-circular section, it has been found from experiment that the fundamental requirement for satisfactory reflection from simple 90—45—45° prisms is that the axial planes of the prisms shall be in the same planes as the incident and reflected rays, except for the displacement caused by the reflection. So long as this condition is fulfilled, the light may be incident on the hypotenuse face at any angle whatsoever and perfect reflection is obtained.

By the use of this principle, it is possible to determine the disposition of simple 90—45—45° prisms to give perfect reflection on non-circular glass bodies without either of the modifications referred to in the previously mentioned patent specifications.

Briefly stated, the present invention comprises a prismatic reflector of non-circular section in which the prism systems radiate from the points of normal incidence and reflection and in which at any point on the surface of the reflector the axial plane of the prism passing through said point lies substantially in the plane of the incident and reflected rays reaching and leaving that point.

Prismatic reflectors, such as above referred to, may be employed for street lighting, particularly where asymmetric lighting effects are desired and the angle of maximum beam is depressed below the horizontal. In such cases, the reflector is of non-circular section in horizontal planes to effect the desired asymmetric distribution and curved in vertical planes to depress the beam below the horizontal. A convenient non-circular section to employ is the ellipse or an approximation thereof. Both ends of the ellipse may be used for light distribution into two beams or three or four elliptical portions may be used where three or four beams are desired.

One of the characteristics of a street lighting unit is that the instance between the light sources is several times as large as the height of the sources above the street level. An average spacing-height ratio usually varying from six or eight to one is employed in main streets and from eight or ten to one in secondary streets. A second characteristic is that the roadway generally is narrow compared with the distance between the lamp posts. As a result of these characteristics, it is necessary, if an attempt is to be made to light the roadway in between lamp posts at all satisfactory, to direct a considerable flux of light in the direction of the length of the road, and at a comparatively small angle below the horizontal—say in the neighborhood of 15° or 20°. This is accomplished by what are called "refractors".

The present invention, however, contemplates a street lighting unit in which the light source is covered by a prismatic reflector shaped and contoured to cut off the direct view of the lamp filament for an appreciable angle below the horizontal and to reflect from the skirt the major portion of the flux of light incident on it from the light source downward toward the road level. Such a reflector is adapted to permit some of the incident light to pass through it and is enclosed in a light diffusing envelope adapted to be lit up by this light.

The accompanying drawings show, for purposes of illustrating the present invention, one form in which it may be embodied with modifications of certain parts, it being understood that the drawings are illustrative of the invention rather than limiting the same.

In these drawings:

Fig. 1 is a plan view of the prism arrangement of a flat prismatic plate of rectangular shape;

Fig. 2 is a section along the arc 2—2 of Fig. 1;

Fig. 3 is a plan view similar to Fig. 1 of a triangularly shaped prismatic reflector;

Fig. 4 is a diagrammatic view illustrating the path of light rays through a typical prism;

Fig. 5 is an outline view of an elliptical reflector;

Fig. 6 is a side elevational view of the same, a portion of the prisms being shown;

Fig. 7 is a section on line 7—7 of Fig. 5, parts being in section;

Fig. 8 is a section along line 8—8 of Figs. 5 and 7, showing the prismatic reflector with a diffusing cover also of elliptical shape;

Fig. 9 is an inverted plan view of the reflector and cover, parts being broken away and parts in section; and Fig. 10 is a fragmentary view showing a modification.

Applications of the method of making prismatic reflectors forming the present invention to a flat sheet reflector such as may be used in the building up of a large composite reflector as is sometimes used for flood lighting purposes are shown in Figs. 1, 2, 3, and 4. In order to make such prismatic reflectors it is necessary first of all to determine the position of the light source relative to the plate. It is then necessary to fix the point on the plate which receives light from the source along the normal in every plane. This point 1 (Figs. 1 and 3) is the center from which the reflecting 90—45—45° prisms must radiate to give perfect reflection from every point on the plate surface (this point may be outside the boundaries of any particular plate).

These prisms on the back of the plate are not necessarily grouped as shown in the drawings but may be grouped in any of the well known ways, for instance parallel, merged, stilletto, provided they radiate from the desired point in the plane of the plate. This condition ensures that the axis of each prism is on the same plane as the incident and reflected rays.

The path of a typical ray R is shown in Fig. 4. This ray is in a plane through the light source and normal to the surface of the plate at the point of incidence. The axial plane of the prism P is substantially coincident. The ray R is refracted by the glass and bent downwardly toward the surface $p$ as indicated at $a$. It is reflected, as indicated at $b$, and passes across the prism, as indicated at $c$, where it strikes the surface $p'$ which reflects it toward the upper surface of the glass, as indicated at $d$. The light is emitted, as indicated at $R'$, the ray $R'$ being in substantially the same plane as the ray R, except for the offsetting caused by the prism.

Figs. 5 to 9 illustrate the application of reflecting prisms of this type to a street lighting reflector of non-circular section. The reflector form 10 is of elliptical shape in horizontal section with axes indicated at 7—7 and 8—8 in Fig. 5 and is concave inwardly in vertical planes. The position of the light source is indicated at S in Figs. 8 and 9. The outer surface of the reflector is provided with a series of totally reflecting prisms P which radiate from two points of normal incidence of light, located at 11 and 12 on the short axis 8—8 of the ellipse, and the prisms extend toward the long axis 7—7 of the ellipse as will be clear from the drawings. Some of the prisms terminate at the lower flange 13, others at the upper rim 14, while the remaining prisms meet similarly formed prisms on the opposite half of the ellipse. The prisms appear warped when viewed from the side but the contour and location of each prism is determined by the intersection of the plane of normal incidence of the light with the body shape given the glass.

The external diffuser 20 (Figs. 8 and 9) fits about the reflector. It may be either opal, or opalescent, or clear glass with diffusing prisms or flutes 21 on the interior as shown. Alternatively this envelope may have diffusing prisms or flutes on its exterior surface or may be formed of so called frosted glass, or any combination of these. The envelope may be of coloured glass—or a coloured screen may be inserted between the two pieces of the unit, e.g. red, in order for instance to act as a warning of a cross road. The two pieces 10 and 20 are kept dust proof by seating into a suitable fitting at the neck and being clamped together by any suitable means.

With such a reflector in a street lamp, the light rays which are emitted by the lamp in directions above a predetermined angle below the horizontal, are redirected by reflection toward the roadway and are also concentrated laterally into two main beams. This predetermined angle below the horizontal is usually from 10° to 30° depending upon the mounting height and spacing of the luminairs for which the reflector is designed. In this construction, the reflecting prisms cause both vertical and lateral deviations in the reflected rays, but it is obvious that the incident and reflected rays from any one particular point on the surface of the reflector are necessarily in a plane and if the axis of the prisms through the point under consideration is in the same plane, then the deviation or direction of reflected light is produced by providing the required inclination and orientation of the surface of the body glass carrying the prisms.

In a reflector of this type it is obvious that the rays which are emitted from a central source of light and incident along the vertical through the minor axis are deviated on reflection only in a vertical plane. The application of the principle comprised in the present invention therefore necessitates the prisms 15 at the minor axis being vertical. On the other hand there is generally a line not necessarily straight, running round the reflector from which the incident light is returned on reflection with no vertical deviation—but with a lateral (or horizontal) deviation. This necessitates the provision of a horizontal prism in this region. The points 11 and 12 at which this line of horizontal prism formation cuts the vertical prisms 15 at the minor axis are, of course, those points at which the reflected rays suffer no deviation at all, but are returned along their own path. Such a prism is shown at 16. These are the points from which the reflecting prism systems must radiate. The actual laying out of the prism systems depends on the contour of the reflector body—but they must always radiate (not necessarily in straight lines) from the points of normal incidence and reflection, such as 11 and 12, and at each point on the surface of the reflector the prism axis passing through the point must lie in the plane of the incident and reflected rays reaching and leaving that point.

Instead of having the prisms meet along the longer axis as shown in Fig. 7, one may provide a single vertical radial prism along this major axis, as shown at 22 in Fig. 10.

In setting out the prism structure of an ellipsodial reflector to be used for street lighting, the prisms radiating from the point 11 where the minor axis crosses the line of horizontal prism formation 16 produce the main beams for lighting the distant parts of the roadway. The rays reflected from the prisms radiating from the point where the major axis crosses the line of horizontal prism formation only serve to direct light across the roadway. In this system of lighting it is advisable to arrange for a small proportion of the light incident in the neighborhood of the major axis to be transmitted on to the diffusing glass envelope 20 as illustrated in Fig. 9 so as to illuminate adjacent buildings and to give to the unit a general surface brightness of a low order. For this purpose the prism structure may be simplified somewhat by providing a smaller number of radiating prisms.

With this simplified prism construction the light emitted by the lamp near the horizontal—and in the direction of the major axis is satisfactorily reflected—but the light emitted at higher angles in this direction is not completely reflected.

Some considerable proportion of it is refracted by the outer prisms; the rays are thus broken up and directed to different parts of the outer envelope of diffusing glass.

Instead of prismatic glass the reflector form may be made of any other suitable reflecting material provided that some of the light from the lamp is permitted to pass on to the outer diffusing envelope 20, e. g. by leaving parts of a glass shape unsilvered or semi-silvered or by suitably piercing a metal or enamel reflector. The light passing on to and through the diffusing envelope gives it a surface brightness of a low order not sufficient to cause any glare but sufficient to light up the sides of the houses near by, and to relieve the gloom that is characteristic of streets lit by opaque reflectors.

Such a compound unit as has been described therefore provides two light components, (1) strong reflected symmetrical beam or asymmetrical beams of light down toward the road level, and directed chiefly to areas some distance from the foot of the lamp post and (2) a soft diffused light of a general character in upward, horizontal, and slightly below the horizontal directions.

When the light source is placed centrally, that is where the major and minor axes cross, an ellipsoidal reflector of the type shown concentrates the major portion of the reflected light into two beams which lie in the vertical plane containing the minor axis of the ellipse. The vertical contour of the reflector along the minor axis is such as to produce an intense reflected beam at an angle from 10° to 30° below the horizontal and a gradually lessening intensity as the angle from the horizontal increases, in such a way as to counter-balance the reduced direct illumination of the roadway at distances from the foot of the post.

For an asymmetric distribution, the shape can be modified in many ways. If equal distribution in two directions at 180° to one another is desired, the shape may be a true ellipse. If unequal distribution is desired, the shape may be oval or egg-shaped. If distribution in two directions with beams less than 180° apart laterally is desired, the light source may be offset slightly from the center, or the axes of the ellipses relocated. Where distribution in four directions at right angles to one another is desired, the reflector form would partake of two ellipses with major axes crossing at right angles. A distribution in three directions would be obtained by arranging three elliptical portions at the desired angle to one another.

What is claimed is:

1. A prismatic reflector having external prisms on a reflector form concave to incident light and of non-circular section, wherein the prism systems radiate from the points of normal incidence and reflection and in which at any point on the surface of the reflector the prism axis passing through said point lies in the plane of the incident and reflected rays reaching and leaving that point.

2. A prismatic reflector of ellipsoidal form as claimed in claim 1 in which the reflecting prism formations radiate from the points where vertical prisms on the major and minor axes of the reflector are crossed by horizontal prisms on the line running round the reflector from which the incident light is returned with no vertical deviation.

3. A prismatic reflector for street lighting installation as claimed in claim 2 in which the prism formations only radiate from the two minor axis crossings and are continued up to the major axes.

4. A reflector form composed of a plurality of segments joined together, the segments being elliptical in shape in planes at right angles to the physical axis of the reflector form, the reflector form having a plurality of prism systems which radiate from the points of normal incidence and reflection and in which at any point on the surface of the reflector the prism axis passing through said point lies in the plane of the incident and reflected rays reaching and leaving that point.

5. A reflector form as in claim 4, wherein the major and minor axes of said segments are coincident and the segments alike, the points from which said prism systems originate being on the common minor axis of the elliptical form.

6. A prismatic reflector having external prisms on a reflector form which is concave to incident light and of elliptical cross section in planes at right angles to its axis, the prisms radiating from points of normal incidence and reflection of light from a light source on the axis of the reflector form, the positions of the prisms on the surface of the reflector form being determined by the intersections with said reflector form of a system of planes passing through said points of normal incidence and the light source.

7. A prismatic reflector as in claim 6, provided with a lower outwardly extending elliptical flange and an upper supporting rim, the shorter prisms extending to the rim and flange, the longer prisms meeting at the major axis of the ellipse.

8. A reflector form elliptical in cross section in planes at right angles to the axis of the form, the major and minor axes of the ellipses becoming progressively shorter in such a manner that the cross section of the reflector form in planes through the axis is concave inwardly.

9. A prismatic reflector form elliptical in cross section in planes at right angles to the axis of the form, the major and minor axes of the ellipses becoming progressively shorter in such a manner that the cross section of the reflector form in planes through the axis is concave inwardly, the prisms being externally disposed and radiating from points of normal incidence and reflection and in which at any point on the surface of the reflector the prism axis passing through said point lies in the plane of the incident and reflected rays reaching and leaving that point.

10. A flat prismatic reflecting plate having a plurality of totally reflecting prisms on one side of the plate, the prisms radiating from a point in the plane of the plate and their axial planes being perpendicular to the plate and intersecting at the normal to the point from which they radiate.

11. A street lighting unit in which the light source is covered by a reflector shaped and contoured to cut off the direct view of the lamp filament for an appreciable angle below the horizontal and to reflect from the skirt the major portion of the flux of light incident on it from the light source downward toward the road level and in which the reflector is adapted to permit some of the incident light to pass through it and is enclosed in a light diffusing envelope adapted to be lit up by this light.

12. A street lighting unit as claimed in claim 11 in which the higher parts of the reflector are adapted to reflect downward toward the road a smaller proportion of the light than the main beam reflected from the skirt at steeper angles, the said main beam gradually diminishing in intensity toward nadir.

13. A street lighting unit as claimed in claim 11 in which the reflector is elliptical or approximately elliptical in section and is adapted to reflect the major portion of the flux of light from the light source in two main beams from opposite sides of the reflector.

14. A street lighting unit comprising a prismatic reflector having external prisms on a reflector form concave to incident light and of non-circular section, wherein the prism systems radiate from the points of normal incidence and reflection and in which at any point on the surface of the reflector the prism axis passing through said point lies in the plane of the incident and reflected rays reaching and leaving that point, and an external diffusing envelope adapted to be illuminated by light which passes through the reflector.

15. A street lighting unit comprising a prismatic reflector having external prisms on a reflector form which is concave to incident light and of elliptical cross section in planes at right angles to its axis, the prisms radiating from points of normal incidence and reflection of light from a light source on the axis of the reflector form, the positions of the prisms on the surface of the reflector form being determined by the intersections with said reflector form of a system of planes passing through said points of normal incidence and the light source, and an external diffusing envelope adapted to be illuminated by light which passes through the reflector.

16. A street lighting unit comprising a reflector form elliptical in cross section in planes at right angles to the axis of the form, the major and minor axes of the ellipses becoming progressively shorter in such a manner that the cross section of the reflector form in planes through the axis is concave inwardly, the reflector form being adapted to transmit a small amount of light outwardly, and an external diffusing envelope adapted to be illuminated by light which passes through the reflector.

Signed at London, England, this 26th day of January, 1932.

SOLOMON ENGLISH.